(12) United States Patent
Okuyama et al.

(10) Patent No.: US 11,553,573 B2
(45) Date of Patent: Jan. 10, 2023

(54) RELAY CIRCUIT AND ELECTRIC JUNCTION BOX

(71) Applicants: Sumitomo Wiring Systems, Ltd., Yokkaichi (JP); Toyota Jidosha Kabushiki Kaisha, Toyota (JP)

(72) Inventors: Shohei Okuyama, Yokkaichi (JP); Hiroshi Kimoto, Yokkaichi (JP); Shinji Oshita, Toyota (JP); Nobutoshi Hagiwara, Miyoshi (JP); Kenichi Takayoshi, Nisshin (JP); Hiroki Onoyama, Nishio (JP); Takumi Matsumoto, Nagakute (JP)

(73) Assignees: SUMITOMO WIRING SYSTEMS, LTD., Yokkaichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 16/981,475

(22) PCT Filed: Mar. 7, 2019

(86) PCT No.: PCT/JP2019/009056
§ 371 (c)(1),
(2) Date: Sep. 16, 2020

(87) PCT Pub. No.: WO2019/181531
PCT Pub. Date: Sep. 26, 2019

(65) Prior Publication Data
US 2021/0027962 A1    Jan. 28, 2021

(30) Foreign Application Priority Data
Mar. 22, 2018  (JP) .............................. JP2018-054224

(51) Int. Cl.
*H01H 50/44*  (2006.01)
*H01H 50/54*  (2006.01)
(Continued)

(52) U.S. Cl.
CPC ............. *H05B 47/10* (2020.01); *B60R 16/03* (2013.01); *H01H 50/02* (2013.01);
(Continued)

(58) Field of Classification Search
CPC ..... B60Q 1/0076; B60R 16/03; B60R 16/033; H01H 47/00; H01H 47/22; H01H 50/02; H01H 50/021; H01H 50/44; H01H 50/54
See application file for complete search history.

(56) References Cited

U.S. PATENT DOCUMENTS

| 5,828,192 A | 10/1998 | Kawaguchi et al. | |
| 2009/0212627 A1* | 8/2009 | Sakata | H02H 9/001 307/10.7 |

(Continued)

FOREIGN PATENT DOCUMENTS

| JP | H06-60949 U | 8/1994 |
| JP | H09215340 A * | 8/1997 |

(Continued)

OTHER PUBLICATIONS

International Search Report, Application No. PCT/JP2019/009056, dated May 14, 2019. ISA/Japan Patent Office.

*Primary Examiner* — Levi Gannon
(74) *Attorney, Agent, or Firm* — Honigman LLP

(57) ABSTRACT

A relay circuit includes a relay and a current divider. The relay includes a coil and a contact. The contact is configured to switches on and off a supply of power to a load that is configured to operate with power supplied from a direct-current power supply through conduction of the coil. The current divider is connected between the contact and the (Continued)

load and configured to split a current supplied from the power supply to the load. The current divider incudes a resistor and a capacitor connected in series and grounded.

14 Claims, 4 Drawing Sheets

(51) Int. Cl.
    *H05B 47/10*     (2020.01)
    *B60R 16/03*     (2006.01)
    *H01H 50/02*     (2006.01)
    *H02G 3/08*     (2006.01)

(52) U.S. Cl.
    CPC .......... *H01H 50/021* (2013.01); *H01H 50/44* (2013.01); *H01H 50/54* (2013.01); *H02G 3/08* (2013.01)

(56) References Cited

U.S. PATENT DOCUMENTS

| | | | |
|---|---|---|---|
| 2011/0115287 A1* | 5/2011 | Morita | B60L 50/16 |
| | | | 307/9.1 |
| 2012/0091792 A1* | 4/2012 | Wu | B60L 50/50 |
| | | | 307/10.1 |
| 2013/0119798 A1 | 5/2013 | Song | |
| 2015/0210232 A1* | 7/2015 | Kanzaki | H02H 7/18 |
| | | | 701/36 |
| 2017/0268449 A1* | 9/2017 | Nagata | F02D 41/20 |

FOREIGN PATENT DOCUMENTS

| | | |
|---|---|---|
| JP | 2002-262435 A | 9/2002 |
| JP | 2015-125800 A | 7/2015 |

\* cited by examiner

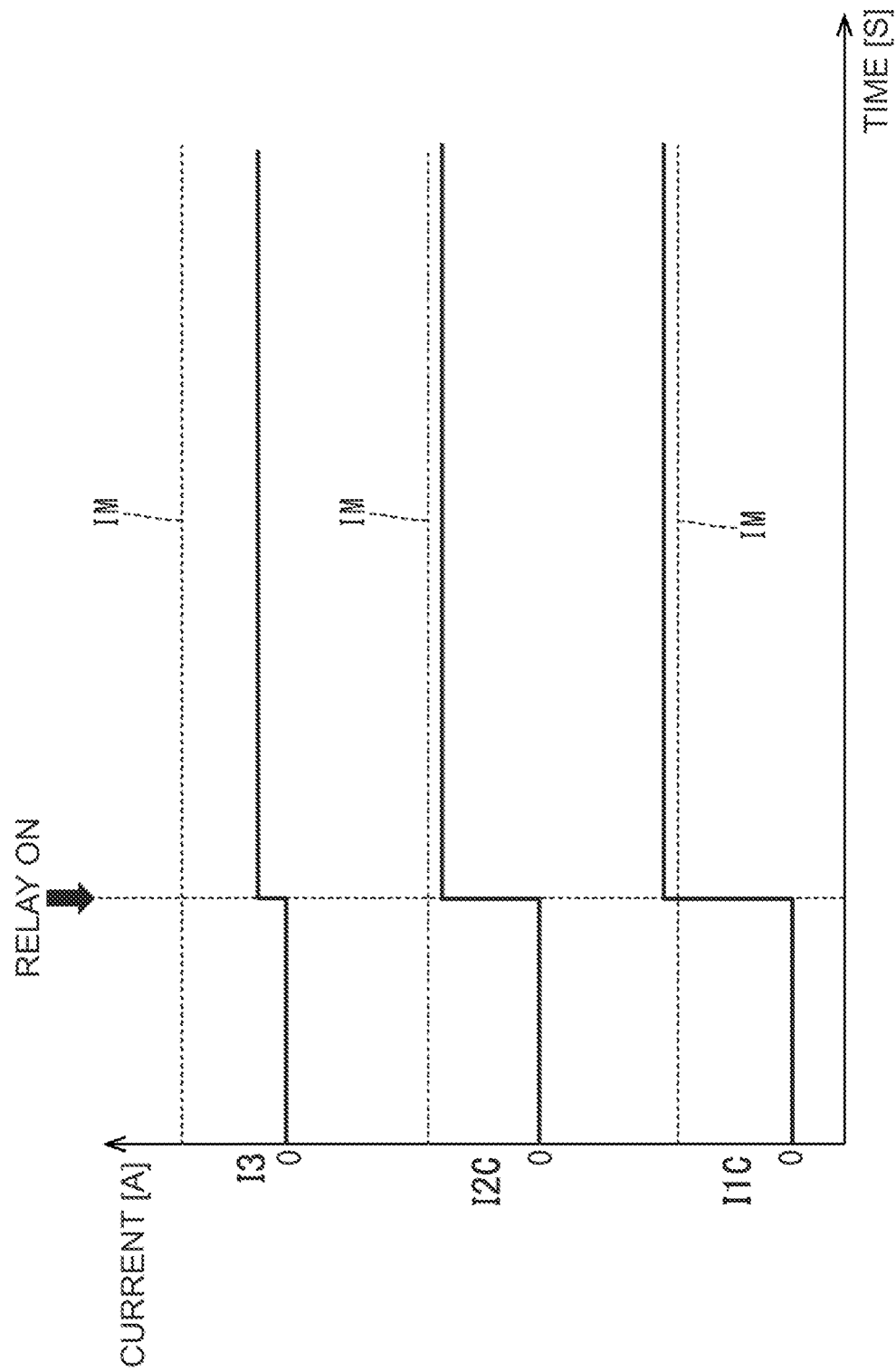

RELAY CIRCUIT AND ELECTRIC JUNCTION BOX

CROSS-REFERENCE TO RELATED APPLICATIONS

This application is the U.S. national stage of PCT/JP2019/009056 filed on Mar. 7, 2019, which claims priority of Japanese Patent Application No. JP 2018-054224 filed on Mar. 22, 2018, the contents of which are incorporated herein.

TECHNICAL FIELD

The technology described herein relates to a relay circuit and an electric junction box.

BACKGROUND ART

A relay circuit that is configured for supplying power from a battery to a load via a relay has been known. In a vehicle lamp disclosed in Japanese Unexamined Patent Application Publication 2015-125800, a first power supply voltage is applied to a lamp ECU and a multifunction circuit in a lighting function unit by an onboard battery via a first relay. A second power supply voltage is applied to the multifunction circuit by the onboard battery via a second relay. The first relay is normally on with an ignition switch or a lamp switch. The second relay is switched on and off according to operation by a user. When the second relay is switched on, an operation signal is input to the multifunction circuit and a light emitting function of the lighting function unit becomes active. A dummy load that includes multiple resistors connected in series is connected to an input line to input the second power supply voltage. A dummy current flows through the dummy load. With the dummy current, a current flowing through the second relay is regulated to be equal to or above a minimum requirement current so that the second relay is less likely to have a contact failure.

In the configuration disclosed in Japanese Unexamined Patent Application Publication 2015-125800, when the second relay is in an on state, the dummy current flows through the dummy load for regulating the flow of current through the second relay normally equal to or above the minimum requirement. Therefore, a current consumption increases. Because the dummy load includes multiple resistors connected in series, components need to be selected based on an assumption that the current normally flows. Therefore, a circuit configuration is complicated and a production cost is more likely to increase.

A technology described herein was made in view of the above circumstances. An object is to provide a relay circuit that includes a relay that is less likely to have a contact failure without normally feeding a current that is equal to or larger than a minimum requirement current of the relay when the relay is in an on state.

SUMMARY

A relay circuit described herein includes a mechanical relay and a current divider. The mechanical relay includes a coil and a contact that is configured to switch on and off a supply of power to a load that is configured to operate with power supplied from a direct-current power supply through conduction of the coil. The current divider is connected between the contact and the load and configured to split a current supplied from the power supply to the load. The current divider includes a resistor and a capacitor connected in series and grounded.

Because the resistor and the capacitor are connected in series in the current divider, it is easy to temporarily increase the current that flows through the contact to be equal to or above a minimum requirement current of the mechanical relay when the mechanical relay is switched to an on state. When the mechanical relay is switched to the on state, an oxide film on a surface of the contact is broken to allow the current to flow without normally feeding the current that is equal to or larger than the minimum requirement current when the mechanical relay is switched to the on state. Therefore, the mechanical relay is less likely to have a contact failure. In comparison to a configuration including a current divider that includes a resistor unit in which multiple resistors are connected in series, the circuit configuration can be simplified and thus the production cost can be reduced.

The following configurations may be preferred for embodiments of the technology described herein.

The current divider may further include a discharge circuit connected in parallel.

According to the configuration, the capacitor can be discharged through the discharge circuit when the mechanical relay is switched to the off state. When the relay is switched back to the on state, the capacitor is charged and the current that flows the current divider increases. Because the current that flows through the contact increases, the mechanical relay is further less likely to have the contact failure.

When the contact of the mechanical relay is switched from the off state to the on state, the current that flows through the contact increases to be equal to or above the minimum requirement current and then decreases to be equal to or below the minimum requirement current and enters into a stable state causing a transient.

According to the configuration, in comparison to a configuration in which a current that is equal to or larger than the minimum requirement current is normally fed when the mechanical relay is in the on state, the power consumption can be reduced.

The current that flows through the load may be smaller than the minimum requirement current of the mechanical relay.

According to the configuration, with the current divider, the relay is less likely to have a contact failure that is more likely to occur in a configuration in which a current that flows through a load is small.

An electric junction box includes the relay circuit. The electric junction box is installed in a vehicle.

Advantageous Effect of the Disclosure

According to the technology described herein, the relay in the relay circuit is less likely to have a contact failure without normally feeing a current that is equal to or larger than the minimum requirement current of the relay when the relay is in the on state.

BRIEF DESCRIPTION OF THE DRAWINGS

FIG. 4 is a view illustrating time-current characteristics of the relay circuit.

DETAILED DESCRIPTION OF PREFERRED EMBODIMENTS

First Embodiment

A first embodiment will be described with reference to FIGS. 1 to 4.

Figure 1:
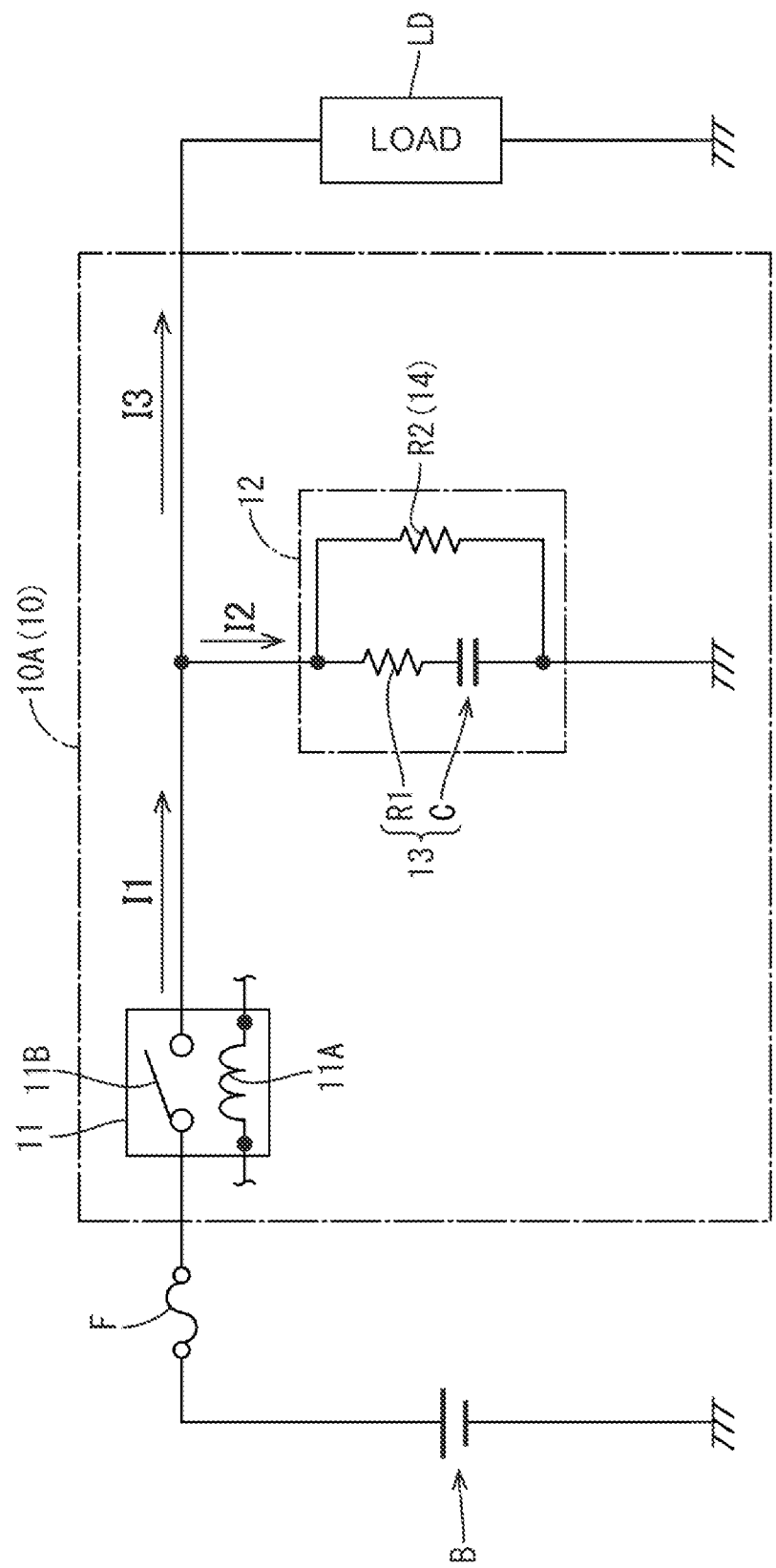
FIG. 1 is a view illustrating an electric configuration including a relay circuit connected between a power supply and a load in a vehicle.

A relay circuit 10A according to this embodiment is held in an electric junction box 10 including an electronic control unit (ECU) installed in a vehicle such as an electric vehicle and a hybrid vehicle. As illustrated in FIG. 1, the electric junction box 10 is disposed between a power supply B and a load LD to control a supply of power from the power supply B to the load LD.

The power supply B is a direct-current power supply. The power supply B may be an onboard rechargeable battery such as a lead battery, a lithium-ion battery, and a capacitor. The load LD may be installed in a vehicle and configured to operate with a relatively small current. Examples of the lead include lamps such as light emitting diodes (LEDs).

The relay circuit 10A includes a relay 11 and a current divider 12. The relay 11 is configured to switch on and off the supply of power from the power supply B to the load LD. The current divider 12 splits the current that is supplied from the power supply B to the load LD. The relay 11 is a mechanical relay. The relay 11 includes a coil 11A and a contact 11B. The supply of power to the load LD is switched on and off through conduction of the coil 11A and the contact 11B. The relay 11 may be a normally open switch, that is, the contact 11B is closed when the coil 11A is conducted or a normally closed switch, that is, the contact 11B is open when the coil 11A is conducted.

The coil 11A may be connected to a control circuit (not illustrated) configured to operate with a power that is supplied by the power supply B. The control circuit may operate with the power that is supplied by the power supply B. The contact 11B is connected between the power supply B and the load LD. A fuse F is connected between the power supply B and the contact 11B.

Figure 2:
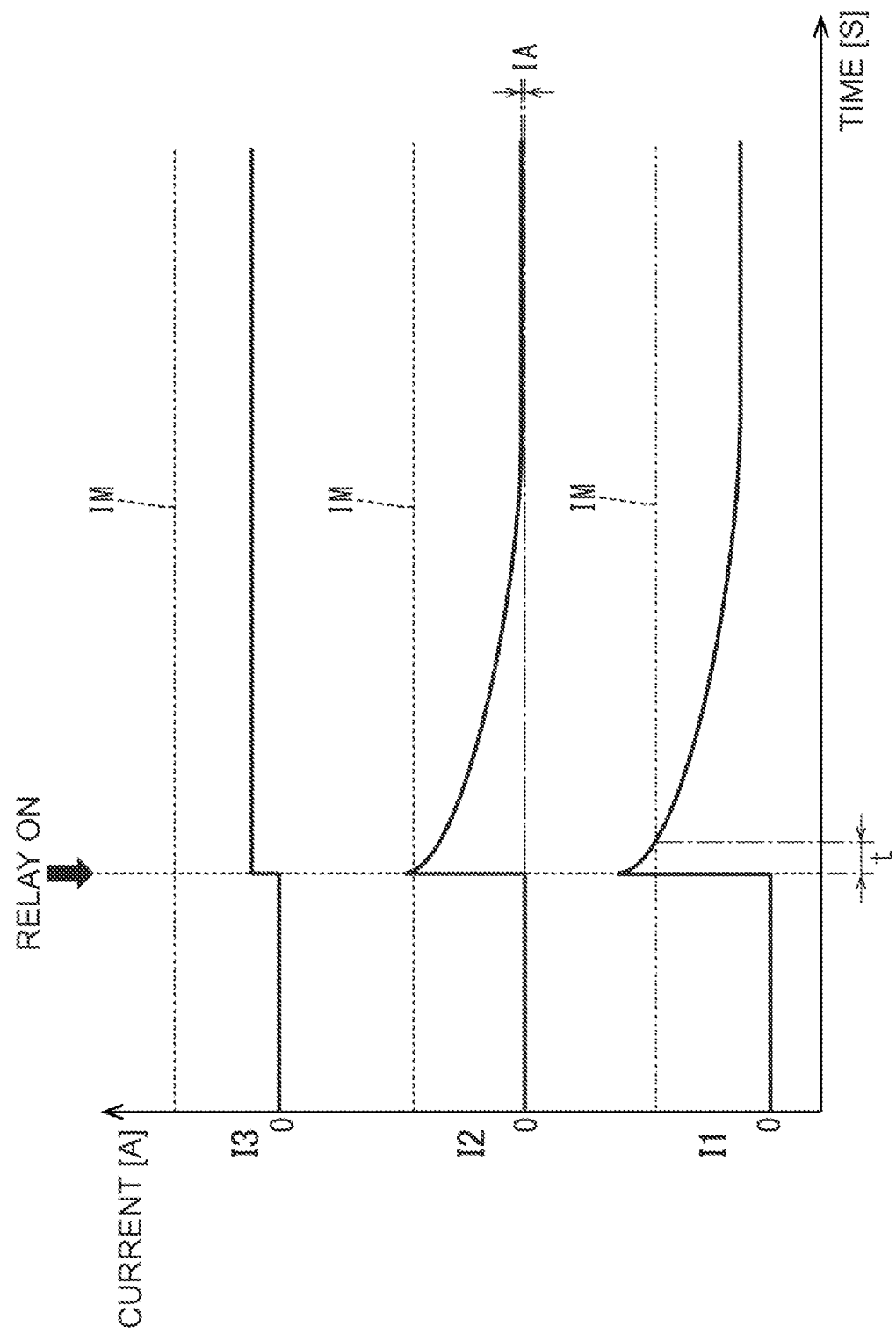
FIG. 2 is a view illustrating time-current characteristics of the relay circuit.

As illustrated in FIG. 2, a minimum requirement current IM [A] of the contact 11B is defied for the relay 11 (e.g., IM=100 [mA]). The minimum requirement current IM is a predefined minimum current that does not cause a conductive failure due to an oxide film formed in the contact 11B in the relay 11. When a current I1 that is equal to or larger than the minimum requirement current IM [A] is fed to the contact 11B and the contact 11B is conducted, the conductive failure is less likely to occur due to a break in the oxide film of the contact 11B. In this embodiment, the minimum requirement current IM of the relay 11 is larger than a current I3 that flows through the load LD (a rated load current).

As illustrated in FIG. 1, the current divider 12 includes a series circuit 13 and a discharge circuit 14. The series circuit 13 includes a resistor R1 and a capacitor C that are connected in series. The discharge circuit 14 includes a resistor R2 connected in parallel to the series circuit 13. The capacitor C in the series circuit 13 includes a first end that is connected to the resistor R1 and a second end that is grounded. As illustrated in FIG. 2, the resistor R1 and the capacitor C are configured such that the current I1 that flows through the contact 11B is equal to or larger than the minimum requirement current IM when the contact 11B of the relay is switched from an off state to an on state and the current I1 is equal to or smaller than the minimum requirement current IM after the elapse of predefined time t (i.e., time constant is set).

The resistor R2 in the discharge circuit 14 has a higher resistance in comparison to the series circuit 13. When the contact 11B is conduced, most of a current I2 flows through the series circuit 13. When the capacitor C is fully charged and the capacitor C holds a potential, the supply of power to the series circuit 13 stops and a small current IA according to the resistor R2 flows through the discharge circuit 14.

Next, operation of the relay circuit 10A will be described.

As illustrated in FIGS. 1 and 2, when the contact 11B is switched from the off state to the on state in response to the conduction of the coil 11A, the current I1 and the current I2 that are defined based on the load LD and the resistance of the current divider 12 flow through the contact 11B and the current divider 12 and the current I3 flows through the load LD.

Figure 3:
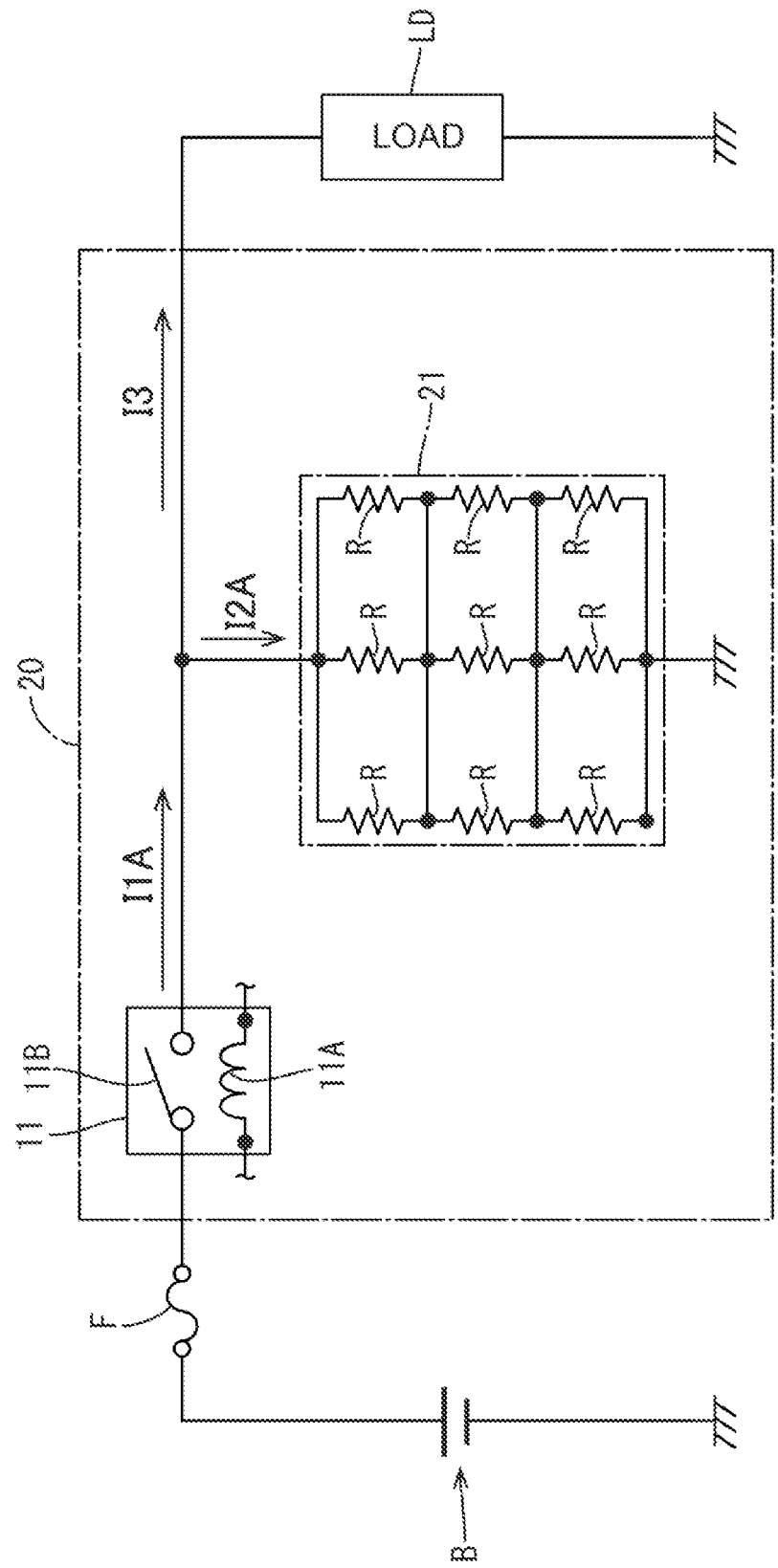
FIG. 3 is a view illustrating an electric configuration including a relay circuit, which is an comparative example, connected between the power supply and the load in the vehicle.

A relay circuit 20, which is an comparative example, is illustrated in FIG. 3. The relay circuit 20 incudes a current divider 21. The current divider 21 includes a resistor unit that includes to multiple resistors R connected in series. As illustrated in FIG. 4, when a current I1C [A] equal to or larger than the minimum requirement current IM [A] flows through the contact 11B of the relay 11 that is on, a constant current I2C [A] that is defined based on a resistance of the resistor unit normally flows through the current divider 21. As illustrated in FIG. 2, when the relay 11 in this embodiment is on, the current I1 that flows through the contact 11B sharply increases to be equal to or above the minimum requirement current IM and gradually decreases to be equal to or below the minimum requirement current IM. Then, the current I1 that is defined based on the resistance of the load LD (and the discharge circuit 14) finally becomes constant (enters into a stable state).

This embodiment exerts the following functions and effects.

The relay circuit 10A includes the relay 11 (the mechanical relay) and the current divider 12. The relay 11 includes the coil 11A and the contact 11B. The contact 11B is configured to switch the supply of power to the load LD through conduction of the coil 11A. The load LD is configured to operate with the power that is supplied by the direct-current power supply B. The current divider 12 is connected between the contact 11B and the load LD to split the current supplied from the power supply B to the load LD. The resistor R1 and the capacitor C are connected in series in the current divider 12 and grounded.

In this embodiment, the resistor R1 and the capacitor C are connected in series in the current divider 12 and thus it is easier to temporarily increase the current that flows through the contact 11B to be equal to or above the minimum requirement current IM of the contact 11B when the relay 11 is switched to the on state. When the relay 11 is switched to the on state, the oxide film on the surface of the contact 11B is broken to pass the current without normally passing a current that is equal to or larger than the minimum requirement current IM. Therefore, the relay 11 is less likely to have a contact failure. In comparison to the configuration including the current divider 12 that includes the resistor unit in which the resistors are connected in series, a circuit configuration is simplified and thus the production cost can be reduced.

The current divider 12 includes the series circuit 13 and the discharge circuit 14. The series circuit 13 includes the resistor R1 and the capacitor C that are connected in series. The discharge circuit 14 is connected in parallel to the series circuit 13.

According to the configuration, the capacitor C can be discharged through the discharge circuit 14 when the relay 11 is switched to the off state. When the relay 11 is switched back to the on state, the capacitor C is charged and thus the current I2 that flows through the current divider 12 increases and the current I1 that flows through the contact 11B increases. Therefore, the relay 11 is less likely to have a contact failure.

When the contact 11B of the relay 11 is switched from the off state to the on state, the current I1 that flows through the contact 11B increases to be equal to or above the minimum requirement current IM of the relay 11 and then decreases to be equal to or below the minimum requirement current IM and enters into a stable state, that is, a transient occurs.

According to the configuration, in comparison to the configuration in which the minimum requirement current IM normally flows when the relay 11 is in the on state, the power consumption can be reduced.

The current that flows through the load LD is smaller than the minimum requirement current IM of the relay 11.

With the current divider 12, the relay 11 is less likely to have a contact failure in the configuration in which the contact failure is more likely to occur in the relay 11 because the current that flows through the load LD is small.

Other Embodiments

The technology described herein is not limited to the embodiments described above and illustrated in the drawings. For example, the following embodiments will be included in the technical scope of the technology described herein.

The number of the resistor R1 and the number of the capacitor C in the series circuit 13 are not limited to those in the above embodiment. For example, multiple capacitors C may be connected in series or parallel. Further, the resistor R1 rather than the capacitor C may be grounded.

The discharge circuit 14 connected to the series circuit 13 in parallel may not be included. The resistor R2 may be connected in series or parallel.

The invention claimed is:

1. A relay circuit comprising:
a mechanical relay including a coil and a contact configured to switch on and off a supply of power to a load configured to operate with power supplied by a direct-current power supply through conduction of the coil; and
a current divider connected between the contact and the load and configured to split a current supplied from the power supply to the load, wherein the current divider includes a series circuit and a discharge circuit, the discharge circuit and the series circuit connected to a first node interposed between the mechanical relay and the load and the discharge circuit and the series circuit connected to a second node which is grounded so as to be in parallel to each other, wherein the series circuit includes a first resistor and a capacitor connected in series; and
wherein the discharge circuit includes a second resistor, the second resistor has a higher resistance than the series circuit.

2. The relay circuit according to claim 1, wherein when the contact of the mechanical relay is switched from an off state to an on state, the current flowing through the contact increases to be equal to or above a minimum requirement current of the mechanical relay and then decreases to be equal to or below the minimum requirement current and enters into a stable state causing a transient.

3. The relay circuit according to claim 2, wherein the current flowing through the load is smaller than the minimum requirement current of the mechanical relay.

4. The relay circuit according to claim 2, wherein the current flowing through the load is smaller than the minimum requirement current of the mechanical relay; and
wherein the discharge circuit includes a second resistor.

5. The relay circuit according to claim 1, wherein the current flowing through the load is smaller than the minimum requirement current of the mechanical relay.

6. An electric junction box comprising the relay circuit according to claim 1, wherein the electric junction box is installed in a vehicle.

7. The electric junction box comprising the relay circuit according to claim 6, wherein when the contact of the mechanical relay is switched from an off state to an on state, the current flowing through the contact increases to be equal to or above a minimum requirement current of the mechanical relay and then decreases to be equal to or below the minimum requirement current and enters into a stable state causing a transient.

8. The electric junction box comprising the relay circuit according to claim 7, wherein the current flowing through the load is smaller than the minimum requirement current of the mechanical relay.

9. The electric junction box comprising the relay circuit according to claim 7, wherein the current flowing through the load is smaller than the minimum requirement current of the mechanical relay; and
wherein the discharge circuit includes a second resistor.

10. The electric junction box comprising the relay circuit according to claim 6, wherein the current flowing through the load is smaller than the minimum requirement current of the mechanical relay.

11. The electric junction box comprising the relay circuit according to claim 10, wherein the discharge circuit includes a second resistor.

12. The electric junction box comprising the relay circuit according to claim 6, wherein when the contact of the mechanical relay is switched from an off state to an on state, the current flowing through the contact increases to be equal to or above a minimum requirement current of the mechanical relay and then decreases to be equal to or below the minimum requirement current and enters into a stable state causing a transient.

13. The relay circuit according to claim 1, wherein when the contact of the mechanical relay is switched from an off state to an on state, the current flowing through the contact increases to be equal to or above a minimum requirement current of the mechanical relay and then decreases to be equal to or below the minimum requirement current and enters into a stable state causing a transient.

14. The relay circuit according to claim 1, wherein the current flowing through the load is smaller than the minimum requirement current of the mechanical relay.

* * * * *